United States Patent
Kang et al.

(10) Patent No.: US 6,459,671 B1
(45) Date of Patent: *Oct. 1, 2002

(54) DISK TRAY SHIFTING DEVICE FOR AN OPTICAL DISK PLAYER

(75) Inventors: Seong Sik Kang, Kyungki-do (KR); Tae Hyong Kim, Seoul (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/928,639

(22) Filed: Sep. 12, 1997

(30) Foreign Application Priority Data

Sep. 12, 1996 (KR) .......................................... 96-39474

(51) Int. Cl.[7] .............................................. G11B 33/02
(52) U.S. Cl. ...................................................... 369/77.1
(58) Field of Search ................................ 369/75.1, 75.2, 369/77.1, 77.2; 360/99.02, 99.03, 99.06, 99.07

(56) References Cited

U.S. PATENT DOCUMENTS

| | | | | |
|---|---|---|---|---|
| 5,204,850 A | * | 4/1993 | Obata ........................ 369/75.2 |
| 5,218,593 A | * | 6/1993 | Kaneo et al. ............... 369/77.1 |
| 5,504,729 A | * | 4/1996 | Ikedo et al. ................ 369/75.1 |
| 5,608,705 A | * | 3/1997 | Tanaka ....................... 369/77.1 |
| 5,691,969 A | * | 11/1997 | Fujisawa .................... 369/77.1 |
| 5,781,523 A | * | 7/1998 | Ozawa et al. .............. 369/77.1 |
| 5,793,729 A | * | 8/1998 | Soga et al. ................. 369/77.1 |

FOREIGN PATENT DOCUMENTS

| | | | |
|---|---|---|---|
| EP | 0416797 A2 | 3/1991 | |
| EP | 0521217 A | 1/1993 | |
| EP | 0548465 A | 6/1993 | |
| EP | 0698882 A | 2/1996 | |
| JP | 5-166281 | * 7/1993 | ................ 369/77.1 |
| WO | 9508172 | 3/1995 | |

OTHER PUBLICATIONS

JP 60-35353 (Mar. 11, 1985) with English language translation of a claim.

* cited by examiner

Primary Examiner—Brian E. Miller
Assistant Examiner—Tod Kupstas

(57) ABSTRACT

Disclosed is a disk tray shifting device for optical disk player in which a loading motor for shifting the disk in installed movable along the cross direction of a main base. The device comprises a guide bar arranged in the cross direction of the main base, a bracket mounted slidably on the guide bar, a loading motor attached to the bottom of the bracket, and a power transmission means installed on the bracket. According to this invention, it is possible to construct the disk tray shifting device simply and compactly by installing the loading motor and the power transmission means on a single bracket.

38 Claims, 14 Drawing Sheets

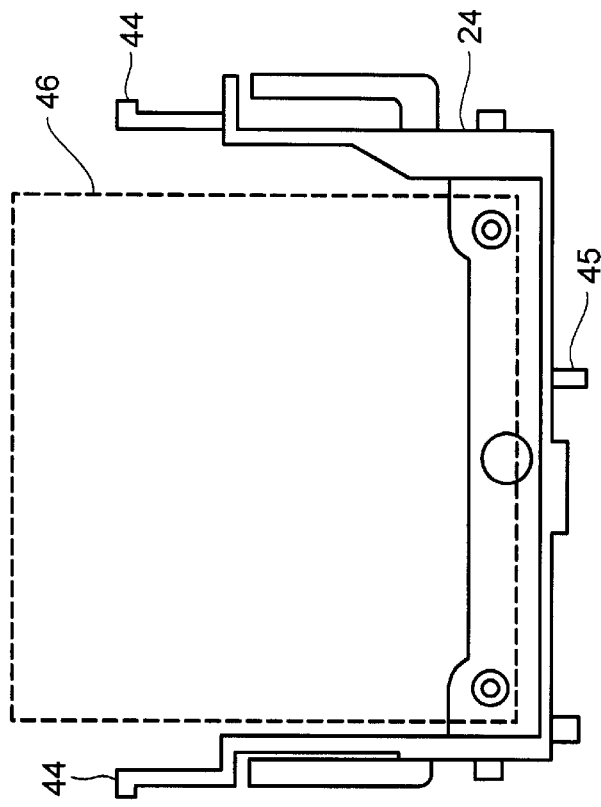
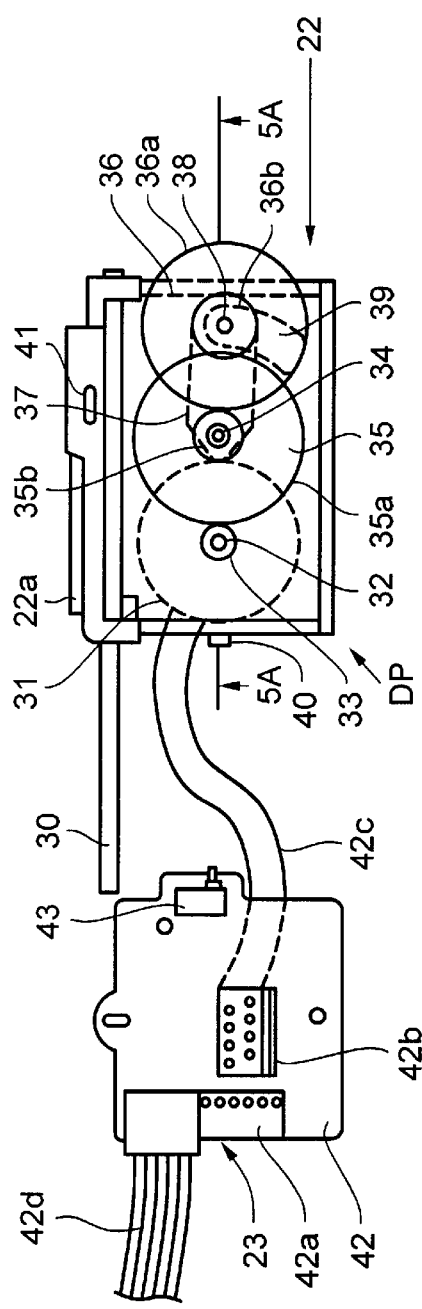
FIG. 4A
FIG. 4B

FIG. 5
FIG. 6
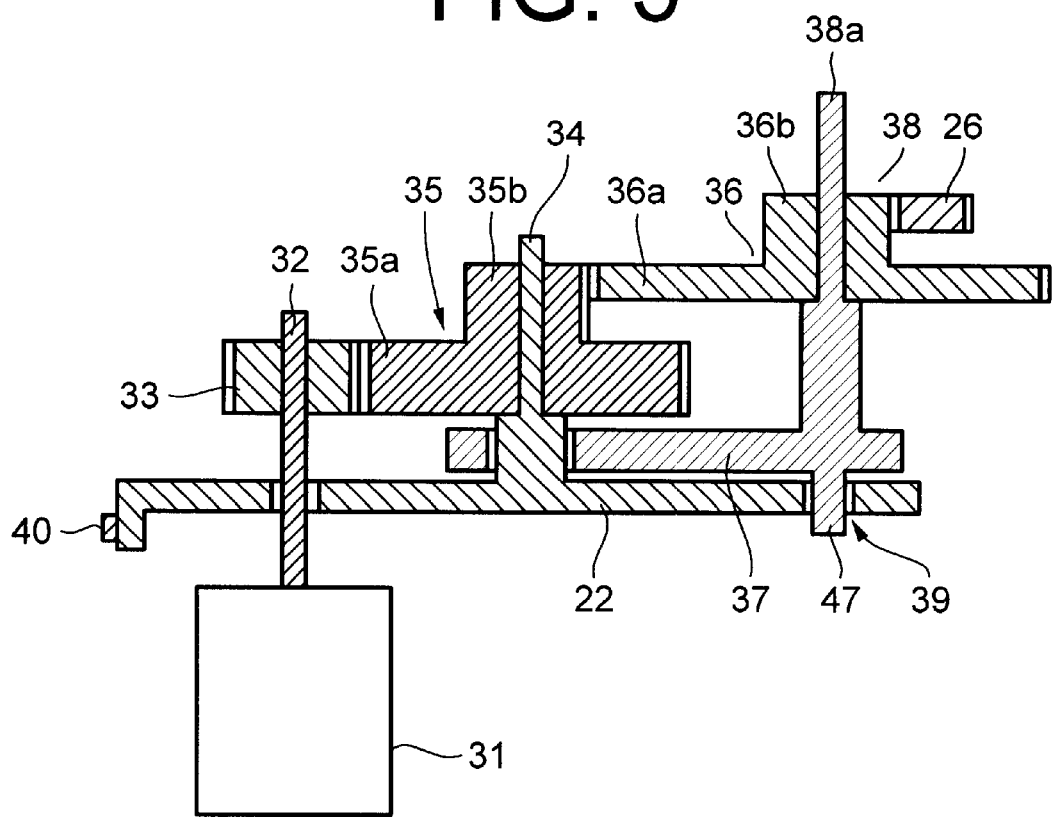
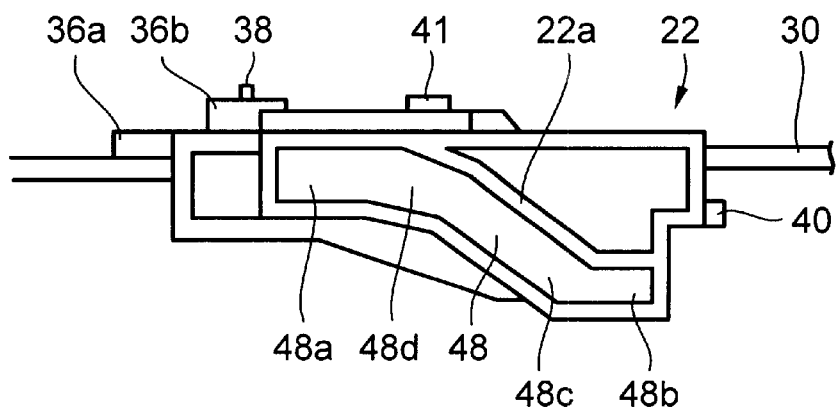

DISK TRAY SHIFTING DEVICE FOR AN OPTICAL DISK PLAYER

BACKGROUND OF THE INVENTION

1. Field of the Invention

The present invention relates to a disk loading device for an optical disk player, for example, a compact disk player or a digital video disk player, and more particularly to a disk tray shifting device wherein a loading motor for shifting the disk tray is installed movably along the cross direction of a main base, so that the device becomes to be compact and the reliability of power transmission thereof is improved.

2. Description of the Prior Art

Conventional optical disk player includes a disk tray for accommodating a disk, and a pickup for reading datum recorded on the disk. A conventional optical disk player also includes a disk loading device including a loading motor for shifting the disk tray from the outside of the player body to the inside thereof or from the inside of said body to the outside thereof is mounted on one end of the main base, and a pickup driving motor for sliding the pickup, is mounted on the other end of the main base.

In the conventional disk loading device as described above, generally, a rack portion is formed on the underside of the disk tray, and a pinion to be rotated by the driving force transmitted from the loading motor is engaged with said rack portion. By this engagement between the rack portion and the pinion, the relative motion of the disk toward a turntable mounted on the pickup base is performed, so that the loading operation or the unloading operation is accomplished. Hereinafter, the structure and the operation of the conventional disk tray shifting device will be described in detail with the appended drawings, FIG. 1 through FIG. 3.

FIG. 1 is a perspective view showing an external appearance of an optical disk player, FIG. 2 is a schematic top view showing a disk tray shifting device of said player, and FIG. 3 is a schematic front view of said disk tray shifting device, In the conventional disk tray shifting device as shown in FIG. 1 through FIG. 3, a loading motor 2 is mounted on one end of the front portion of a main base installed inside a player body 20, and the driving force of said motor 2 is transmitted to a idler gear 7 through a pulley 4 mounted on the upper end of said motor 2, a belt 3 and a gear train. Said gear train consists of a first gear 5 and a second gear 6, and said idler gear 7 includes a pinion 7a on the upper portion thereof, wherein the pinion 7a is formed integrally with said idler gear 7.

Referring to FIG. 2 and FIG. 3, an L-shape arm 9 is inserted pivotably on the shaft 8 of the second gear 6, the idler gear 7 is inserted rotatably on the shaft 9a formed on the first end portion 9b of said arm 9, and a guide protrusion 10 is projected from underside of the second end portion 9c. On the lower end of said shaft 8, a cylindrical cam 11 having a cam groove 11a engraved on the surface thereof is fixedly mounted, and the lower end of said guide protrusion 10 is inserted into a dimple 11d formed on the upper surface of said cam 11 through a curved shape guide slit 12. Said guide slit 12 is formed on the main base 1.

On the other hand, on the underside of a disk tray 13, there is provided with a rack portion 14 along the longitudinal direction of said tray 13, and said rack portion 14 is engaged with the pinion 7a formed integrally with the idler gear 7. Said rack portion consists of a linear shape rack portion 14a and a curved shape rack portion 14b.

In FIG. 3, the reference number 15 indicates a protrusion, which is formed on the front end of an up-down pivoting base (not shown) and inserted to the cam groove 11a of said cam 11. Said up-down pivoting base is pivotably mounted on the main base 1, and supports one side of the pickup base not shown in FIGS. 1–3.

Now the loading operation of said disk tray shifting device will be described.

Firstly, when the disk tray 13 is shifted outwards from the inside of the player, the disk D is placed on said tray 13. Thereafter, if the loading signal is applied to the disk tray shifting device, the loading motor 2 becomes to be actuated so that the pulley 4 mounted on the shaft of said motor 2 is rotated clockwise. At this time, since the driving force of said motor 2 is transmitted to the pinion 7a through the belt 3, the first gear 5, the second gear 6 and the idler gear 7, said pinion 7a engaged with the rack portion 14 is rotated clockwise, so that the disk tray 13 is shifted to the loading position. That is, when the pinion 7a is rotated clockwise by the driving force transmitted from the loading motor 2, the disk tray 13 having the rack portion engaged with said pinion 7a is shifted along the arrow direction, as shown in FIG. 2. Such shifting operation of the disk tray 13 is finished when the end portion of said linear shape rack portion 14a reaches said pinion 7a. Thereafter, when said tray 13 is shifted, the operation for placing the disk D on the turntable is continued.

When the shift operation of said tray 13 is finished, if the pinion 7a continues to rotate, the arm 9 is rotated counterclockwise on the shaft 8 by the rotation of said pinion 7a, and said pinion 7a is moved along the curved shape rack portion 14b. Thus, the guide protrusion projected from the underside of the second end portion 9c of said arm 9 is also moved counterclockwise along the guide slit 12.

At this time, the cam 11 is rotated on the shaft 8 because the lower end of said guide protrusion 10 is inserted into a dimple 11d formed on the upper surface of said cam 11. Accordingly, the protrusion 15, which is formed on the front end of the up-down pivoting base and placed in the first position 11b of the cam groove 11a, is moved along the said cam groove 11a and becomes towards the second position 11c of said cam groove 11a. Therefore, the pickup base is moved upwards, and the disk D placed on the tray 13 is loaded on the turntable of the spindle motor, not shown. Here, said first position 11b of said groove 11a indicates the position of said protrusion 15 when the center hole of the disk D is not inserted on the shaft of the turntable, and said second position of said cam groove 11a indicates the position of said protrusion 15 when the center hole of the disk D is inserted on the shaft of the turntable.

The unloading operation of said disk tray shifting device is performed according to the reverse order of said loading operation.

However, since the loading motor is mounted fixedly on one side of the main base in the above described conventional disk tray shifting device, a large number of components are necessary in order to the power transmission from the loading motor to the pinion. And since the rotating radius of the idler gear and the space occupied with the belt are large, it is necessary to provide a large space for mounting said idler gear and said belt. Therefore, there are problems in miniaturization of said power transmission means and in the accuracy of the power transmission.

In addition, although not shown in FIGS. 1–3, it is necessary to provided separate locking device in order to prevent the tray from moving freely after loading operation in the conventional disk tray shifting device. However, the need for such a separate device also inhibits the miniaturization of said shifting device.

SUMMARY OF THE INVENTION

It is, an object of the present invention to provide a new type disk tray shifting device for the optical disk player in which a loading motor for shifting the disk tray with respect to a turntable is mounted movably in the cross direction of a main base in order to minimize the installation space of components.

Another object of the present invention is to provide a disk tray shifting device which can transmit the driving force of the loading motor to the disk tray by minimizing power transmission stages so as to control the shifting operation of said disk tray precisely.

A further object of the present invention is to provide a disk tray shifting device which is compactly and simply constructed by installing the loading motor and the power transmission means in a single bracket and by minimizing the installation gap between components.

Another object of the present invention is to provide a disk tray shifting device which is able to improve the assembling workability and to interchange the components easily by the compaction.

Still another object of the present invention is to provide a disk tray shifting device in which a locking device for preventing the tray from moving freely after loading operation is formed on said bracket so as to accomplish loading operation and locking operation simultaneously.

A further object of the present invention is to provide a disk tray shifting device in which the upward movement of a pickup base and the crosswise movement of the loading motor can be accomplished together.

Another object of the present invention is to provide a disk tray shifting device wherein a cable for supplying electrical signals to the loading motor can be easily connected without any interference between other components.

Still another object of the present invention is to provide a disk tray shifting device wherein a sensor for detecting the position of the loading motor is simply constructed, and yet wherein a signal transmission assembly for supplying electrical signals to a spindle motor and the like is compactly and simply connected.

These objects are achieved according to the present invention by providing a disk tray shifting device which is arranged in the optical disk player, and which comprises: a main base; a guide bar arranged on said main base along the cross direction of said main base; a bracket mounted slidably on said guide bar and being moved along said guide bar, wherein said bracket includes a guide groove on one side thereof; a loading motor attached to the bottom of said bracket; a tray including a rack portion formed on the underside thereof; a power transmission device installed on said bracket and transmitting the driving force of said loading motor to said tray, wherein said power transmission device consists of a intermediate gear and a idler gear; and a circuit portion mounted on one side of said main base.

In the present invention, said rack portion formed on the underside of the tray includes a longitudinal rack formed along the longitudinal direction of said tray and a lateral rack formed along the cross direction of said tray. Therefore, when a pinion projected from the upper surface of the idler gear is engaged with said longitudinal rack and that pinion begins to rotate, the tray is shifted along the longitudinal direction of the main base. Furthermore, when said pinion is engaged with said lateral rack and that pinion begins to rotate, the bracket is moved along the guide bar in the cross direction of the main base.

When said bracket is moved along the guide bar, an up-down pivoting base supporting one side of a pickup base is pivoted on the shaft upwards or downwards. Thus, a turntable mounted on said pickup base is either inserted into the center hole of the disk, or removed from said center hole.

And when said bracket is moved along the cross direction of the main base, a locking device formed on said bracket is put into contact with a stopper formed on the underside of the tray in order to prevent the tray from moving freely.

In addition, said circuit portion and said loading motor are interconnected with the signal transmission assembly and said circuit portion includes a sensor for detecting the position of said bracket.

BRIEF DESCRIPTION OF THE DRAWINGS

FIGS. 4A–4C are exploded schematic top views showing a disk tray shifting device in accordance with the present invention;

FIG. 5 is a cross sectional view taken on lines A–5A' in FIG. 4A;

FIG. 6 is a rear view of a bracket shown in FIG. 4B;

DESCRIPTION OF THE PREFERRED EMBODIMENT

Figure 1:
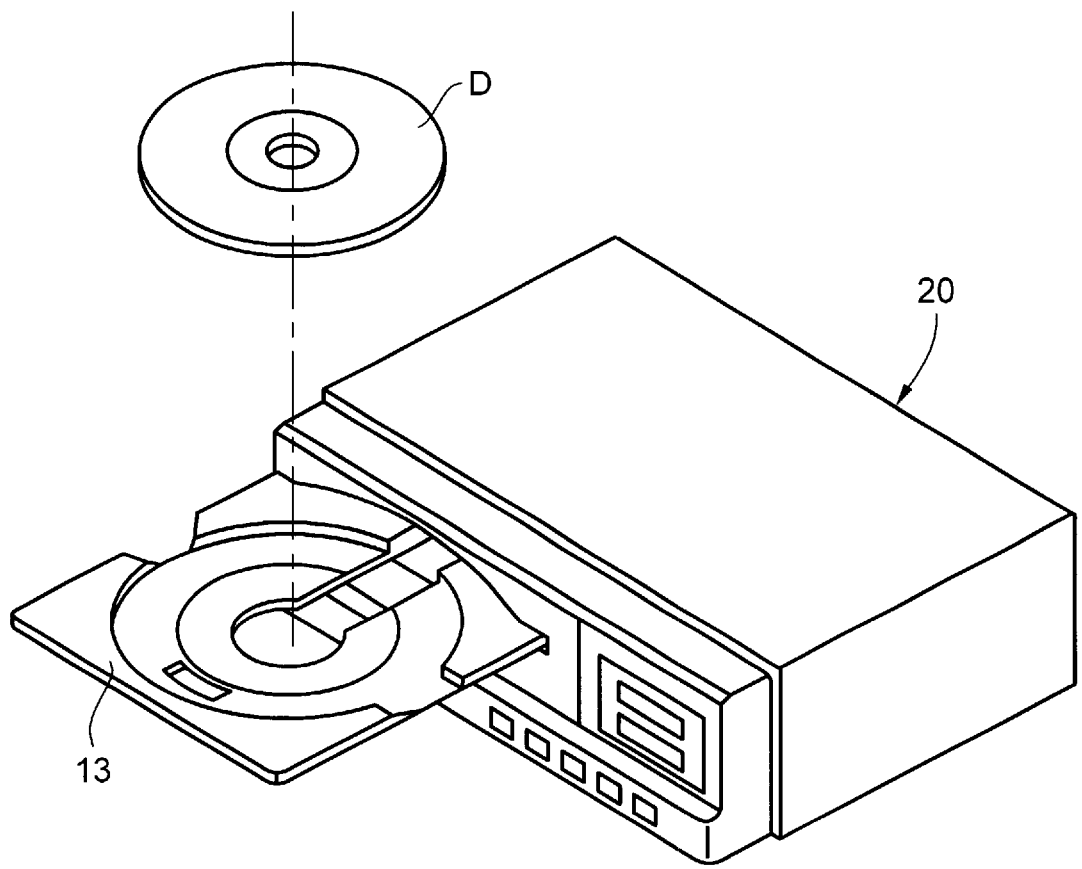
FIG. 1 is a perspective view showing an external appearance of an optical disk player.
Figure 2:
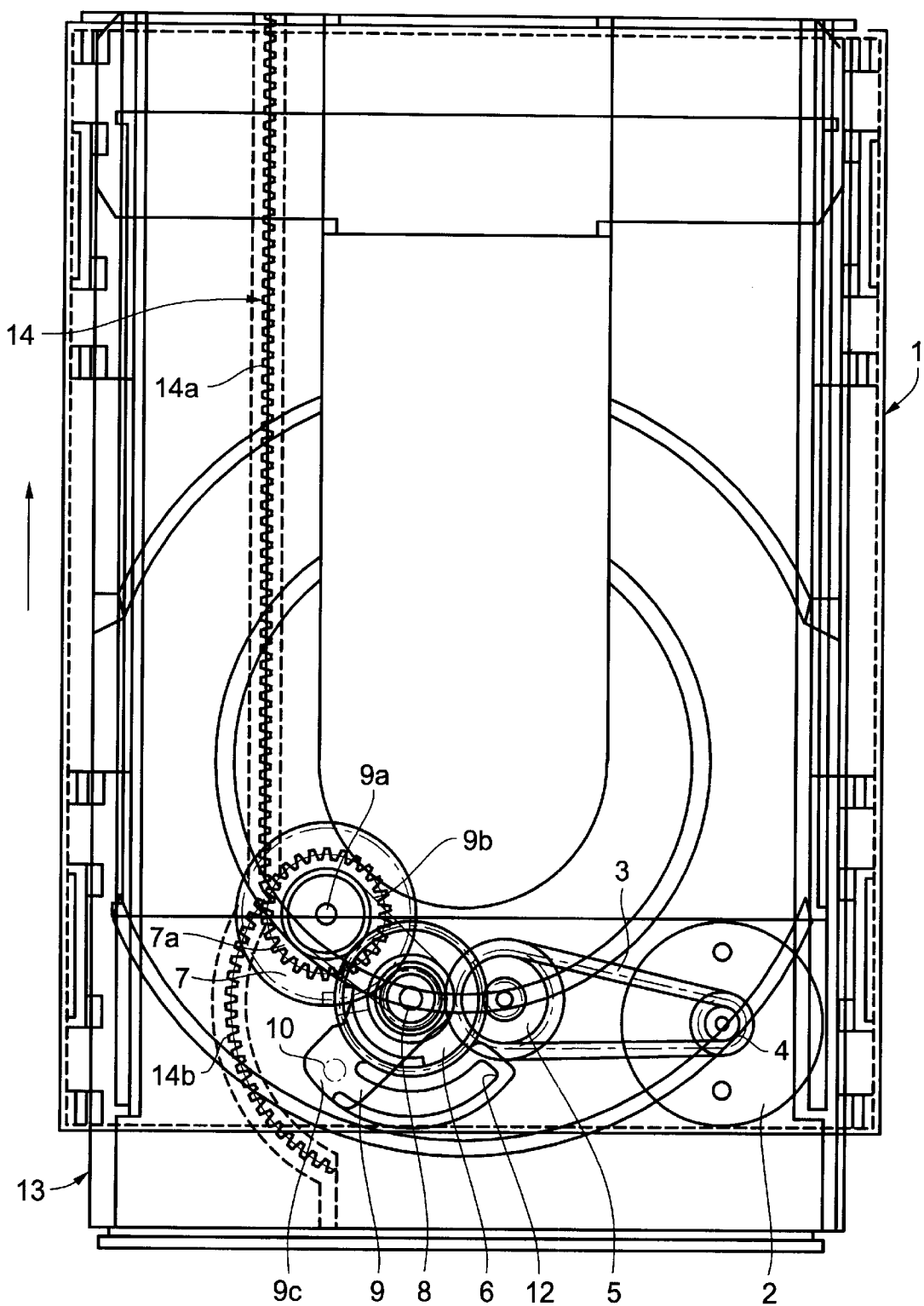
FIG. 2 is a schematic top view showing a conventional disk tray shifting device.
Figure 3:
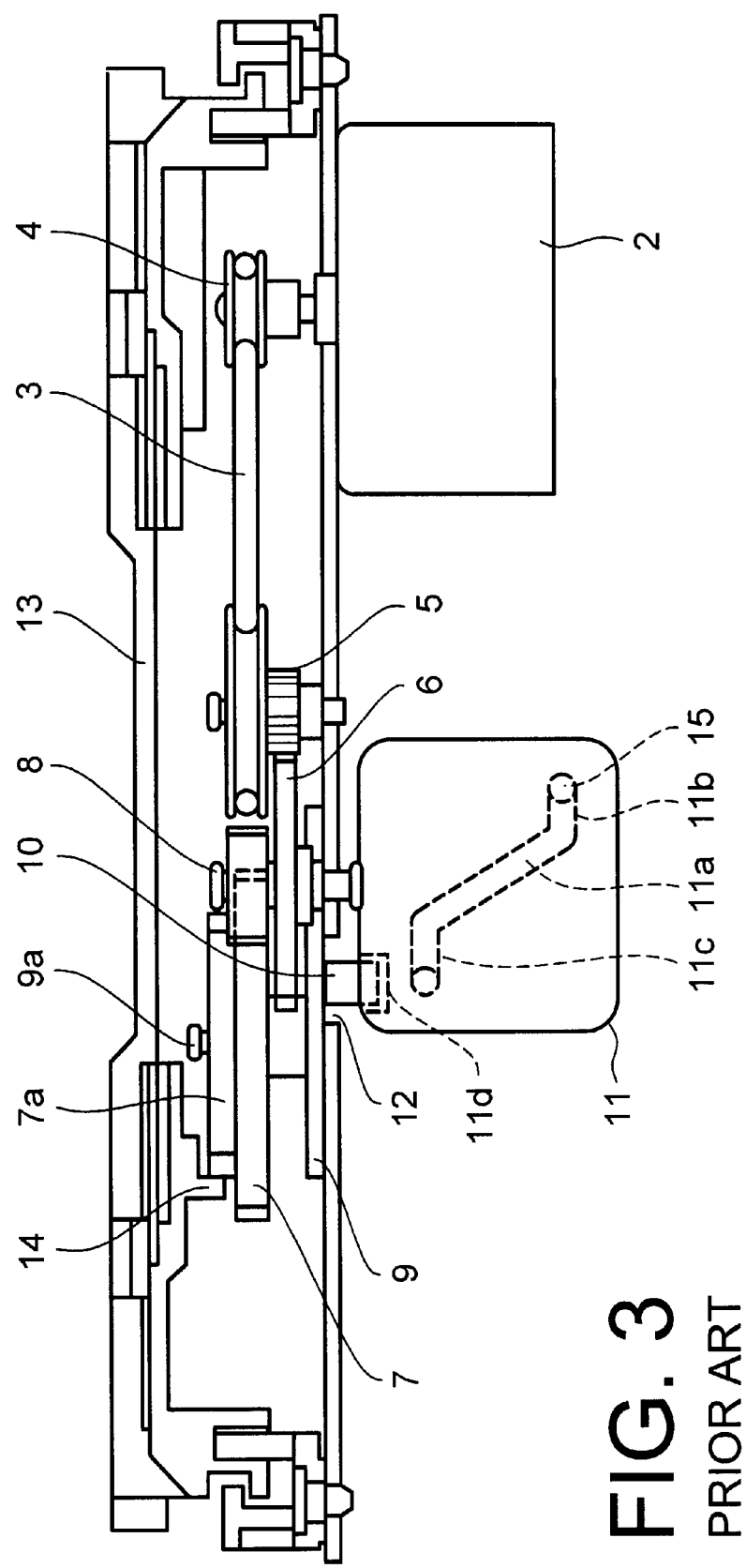
FIG. 3 is a schematic front view showing the conventional disk tray shifting device.
Figure 4C:
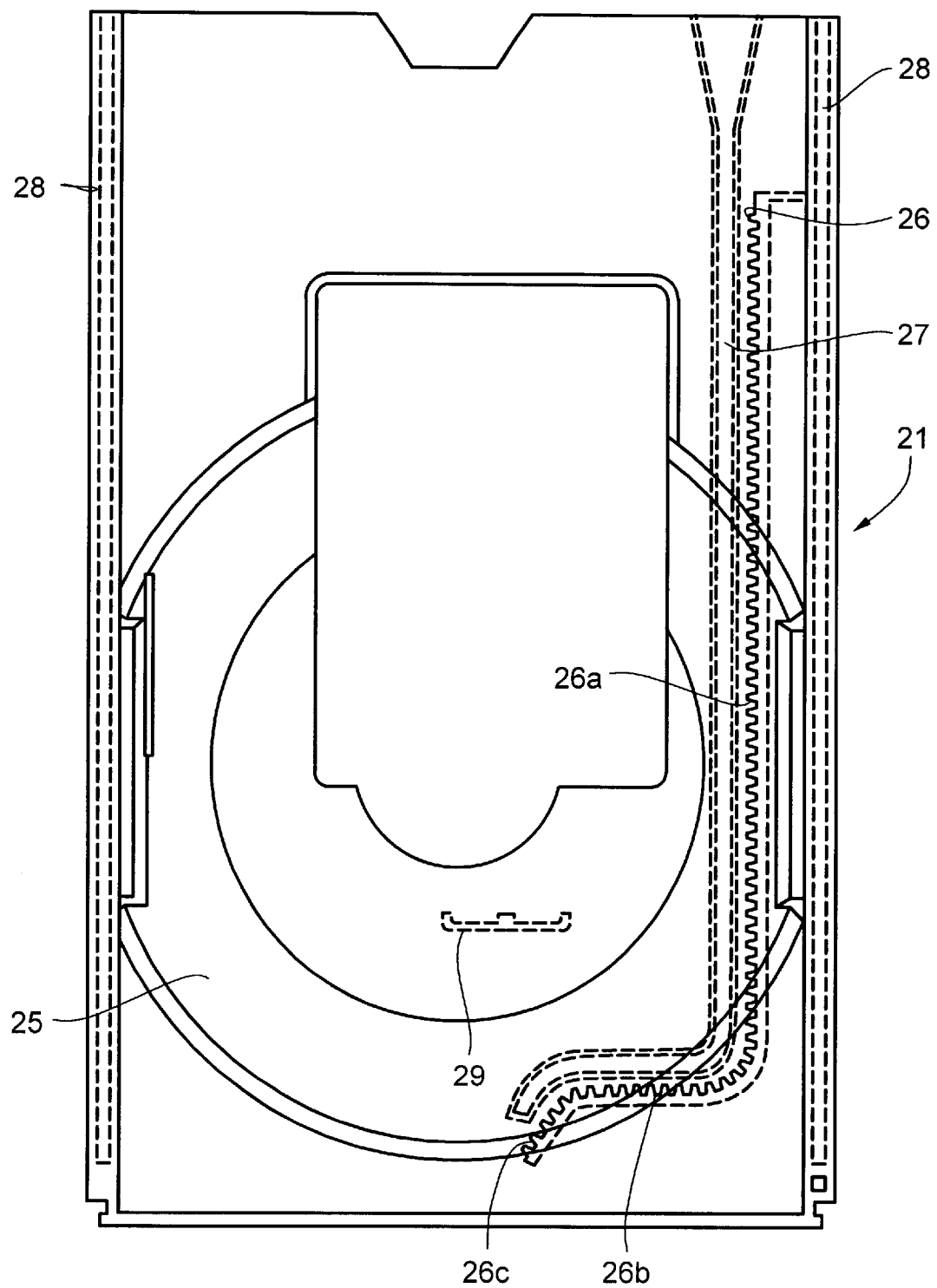

The present invention will now be described in detail with respect to an embodiment shown by the appended drawings.

Referring to FIG. 4A through FIG. 6, the disk tray shifting device in accordance with the present invention comprises a tray 21 for accommodating a disk, a bracket 22 having a loading motor and a power transmission assembly a circuit portion 23 mounted on one side of a main base 16, and a up-down pivoting base 24 supporting one side of a pickup base.

The tray 21, which is arranged on the main base 16, has a concave plate 25 for accommodating the disk, an L-shape rack 26, a first guide groove 27, a second guide groove 28 and a stopper 29. The concave plate 25 and the L-shape rack 26 are formed on the underside of said tray 21. The first guide groove 27 is extended on the underside said tray 21 along the said rack 26, and the first guide groove 27 has almost the same shape as L-shape rack 26. At the central portion of the concave plate 25, a stopper 29 is projected from the underside of said tray. Said rack 26 includes a longitudinal rack 26a being extended along the longitudinal direction of the tray 21, a lateral rack 26b being extended along the cross direction of said tray, and a slanted rack 26c. The second guide grooves 28 are formed at both sides of the upper surface of said tray 21.

Figure 11A:
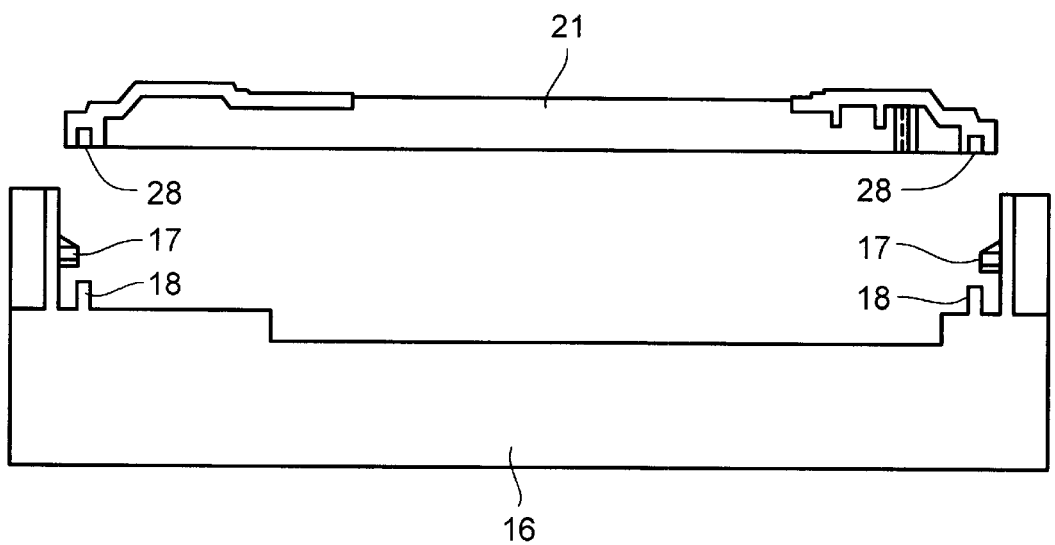
FIGS. 11A and 11B are schematic view illustrating the assembling structure between a main base and the disk tray.
Figure 11B:
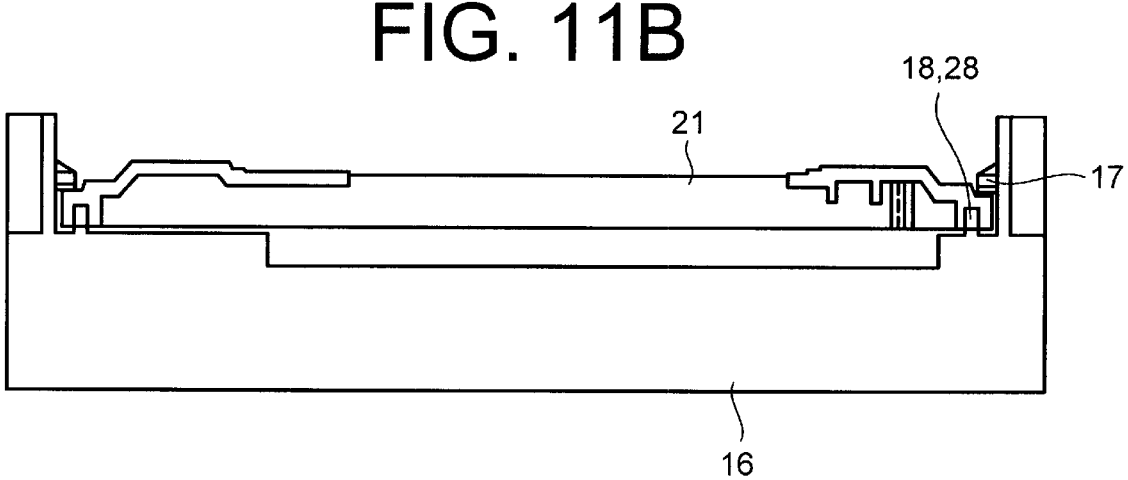

FIGS. 11A–11B are schematic views illustrating the assembling structure between the main base 16 and the tray 21. As shown in FIGS. 11A–11B, the second guide grooves 28 are engaged with protrusions 18 formed on the main base 16, and the upper side portions of the disk 21 contact the lower surfaces of protrusions 17 formed on each side of the main base when the main base 16 and tray 21 are engaged.

The bracket 22 is mounted movably on a guide bar 30 along the cross direction of the main base 16 said guide bar 30 is fixed in the vicinity of the front end portion of the main base. The loading motor 31 is mounted under the bracket 22, and a motor gear 33 is inserted on a motor shaft 32 which is projected upwards from the bracket 22. On the bracket 22, first shaft 34 is formed integrally with said bracket 22 and projected upwards from the upper surface of said bracket. The motor gear is engaged with a large gear 35a of an intermediate gear 35, which is mounted rotatably on said first shaft 34.

On the lower portion of the first shaft 34, one end of an arm which has a second shaft 38 at the other end thereof is inserted rotatably, while an idler gear 36 is disposed on said second shaft 38. The idler gear is includes a large gear 36a and a small gear 36b. The small gear 36b acts as a pinion engaging with said rack 26, and the large gear 36a is engaged with the small gear of the intermediate gear 35. The upper end 38a of said second shaft 38 is extended above said idler gear 36.

Referring to FIG. 5, a guide protrusion 47 is extended from the second shaft 38, and inserted into a guide slit 39 which is pierced on the right said of the bracket 22. On the left end of said bracket 22, there is formed a protrusion 40 for operating a switch disposed on the circuit portion 23. As shown in FIG. 6, a guide cam groove 48 is engraved on the rear surface of the bracket 22, and a locking device 41 is projected from the upper end of said bracket 22.

Referring again to FIG. 4B, the circuit portion 23 is disposed on one side of the main base 16, and a position sensor for detecting the position of said bracket 22 is mounted on said circuit portion 23. In this embodiment, a push switch 43 is used as said sensor, said push switch 43 coming into contact with said protrusion 40 which is formed on the bracket 22. On the circuit portion 23, connecting members 42a and 42b are provided. A signal transmission assembly 42c for supplying the signals to the loading motor is connected to said connecting member 42b, and a signal transmission means 42d for supplying the signals to the spindle motor (not shown), which is used to drive the turntable, is connected to said connecting member 42a. Said circuit portion 23 is electrically connected to the control board disposed in the player body by means of a signal transmission member, not shown. In this embodiment, the flexible cables are used as the signal transmission assembly.

On the other hand, the up-down pivoting base 24 has U-shape, and both shafts 44 thereof are secured rotatably to main base 16, On the front end of said up-down pivoting base 24, there is formed a protrusion 45 which is engaged with the guide cam groove 48 of the bracket 22, as shown in FIG. 6. The up-down pivoting base 24 supports one side of the pickup base 46 and the shafts 44 are secured rotatably to the main base 16, so that the pickup base 46 moves upwards and downwards when the up-down pivoting base 24 is pivoted on the shafts 44.

The structures of the bracket 22 and the power transmission assembly, and the engaging relation between gears in a movable driving portion DP will be understood from FIG. 5 and FIG. 6.

As shown in FIG. 5, the driving force of the loading motor 31 is transmitted to the rack 26 by way of the intermediate gear 35 engaged with the motor gear 33, the idler gear 36 and the pinion formed integrally with said idler gear 36. The idler gear 36 inserted on the second shaft 38 of the arm 37 is rotated around the first shaft 34, the rotating range is defined by the moving range of the protrusion 47 inserted in the guide slit 39. That is, the rotating range of the arm 37 is restricted by the piercing length of said guide slit 39.

Referring to FIG. 6, the guide cam groove 48 is engraved on the rear surface of the bracket 22, 48. The protrusion 45 projected from the front side of the up-down pivoting base is inserted into cam groove 48. The guide cam groove 48 includes an upper horizontal portion 48a, a lower horizontal portion 48b and a slant portion. The slant portion of said guide cam groove 48 includes of a first slant portion 48c with steep slope and a second slant portion 48d with gentle slope.

Now the operation of the disk tray shifting device in accordance with the present invention will be described.

Figure 7A:
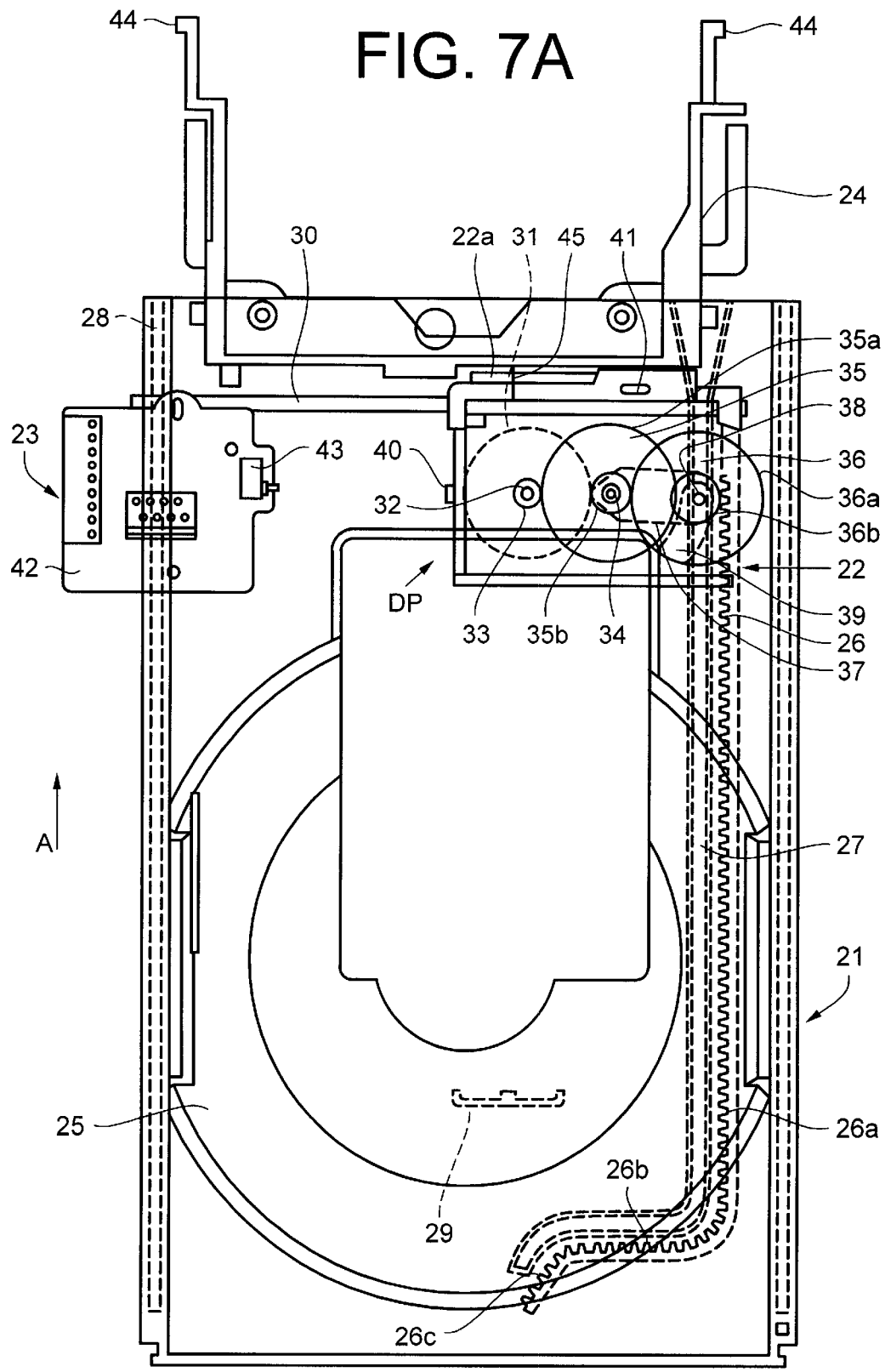
FIG. 7A is a schematic top view showing the unloading state of the disk tray shifting device in accordance with the present invention.
Figure 7B:
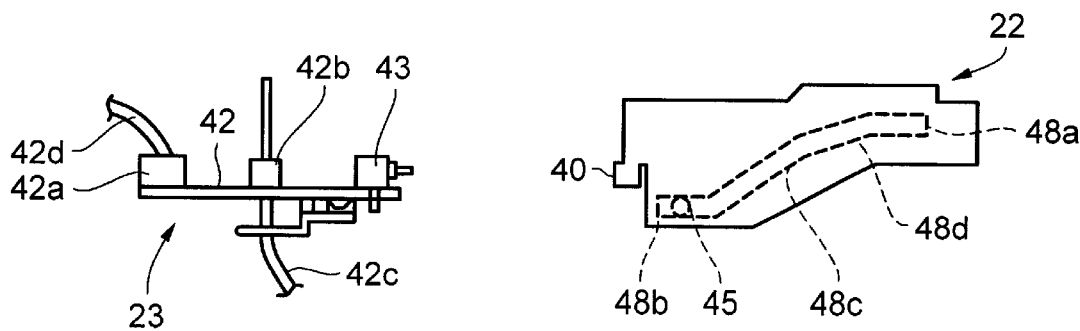
FIG. 7B is a schematic view illustrating the relative position between a bracket and a circuit portion in FIG. 7A.
Figure 7C:
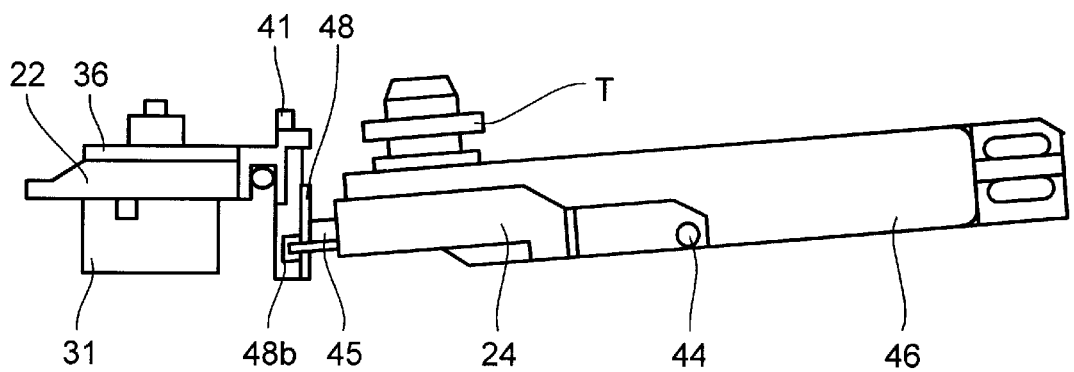
FIG. 7C is a side view of a bracket and a pickup base in FIG. 7A.

FIG. 7A is a schematic top view showing the unloading state of said disk tray shifting device, FIG. 7B is a view illustrating the relative position between the bracket and the circuit portion, and FIG. 7C is a side view of the bracket and the pickup base.

As shown in FIG. 7A, the bracket 22, including the loading motor 31 and the power transmission assembly is located at the right side of the main base 16 in the eject state. At this time, the pinion 36b of the idler gear 36 is engaged with the rear end portion of the longitudinal rack 26b and is inserted to the first guide groove 27 of the tray 21. When the tray is in the eject state, the protrusion 45 formed on the up-down pivoting base 24 is located in the lower horizontal portion 48b so that the front side of said pivoting base 24 keeps the down position.

Thereafter, when the disk is placed on the concave plate 25 of the tray 21 and the loading signal is applied to the disk tray shifting device, the loading motor 31 begins to rotate and the driving force of loading motor 31 is transmitted to the pinion 36b by way of the intermediate gear 35 and the idler gear 36. Since, the pinion 36d is engaged with the rack 26, the tray 21 begins to shift toward the turntable along the arrow direction A.

Figure 8A:
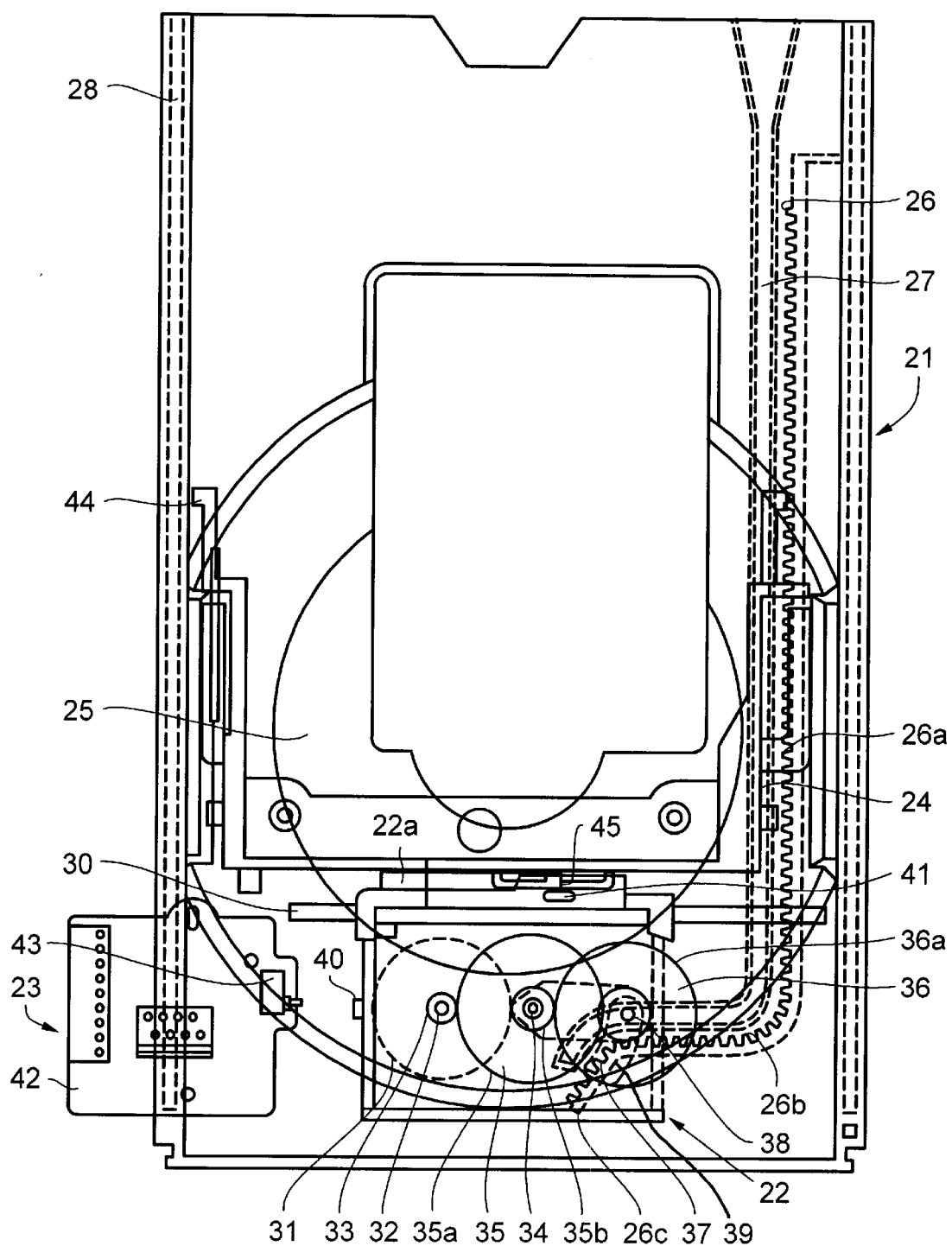
FIG. 8A is a schematic top view showing the progress of the loading operation of the disk tray shifting device in accordance with the present invention.

On the other hand, since the upper end 38a of the second shaft 38 is guided by the first guide groove 27 (see FIG. 7B), rotation of the arm 37 in which the idler gear 36 is mounted thereon is blocked so that rotation of said idler gear 36 is also blocked, and the bracket 22 is located at the right side of the main base. When the pinion 36b reaches the front end of the longitudinal rack 26a, the shifting operation of the tray 21 is stopped. Then, when the pinion 36b is continuously engaged with the lateral rack 26b by the continuous driving of the loading motor 31, the bracket 22 moves along the guide bar 30 in the cross direction. FIG. 8A shows the progress of the loading operation when the bracket 22 moves along the guide bar 30.

Figure 8B:
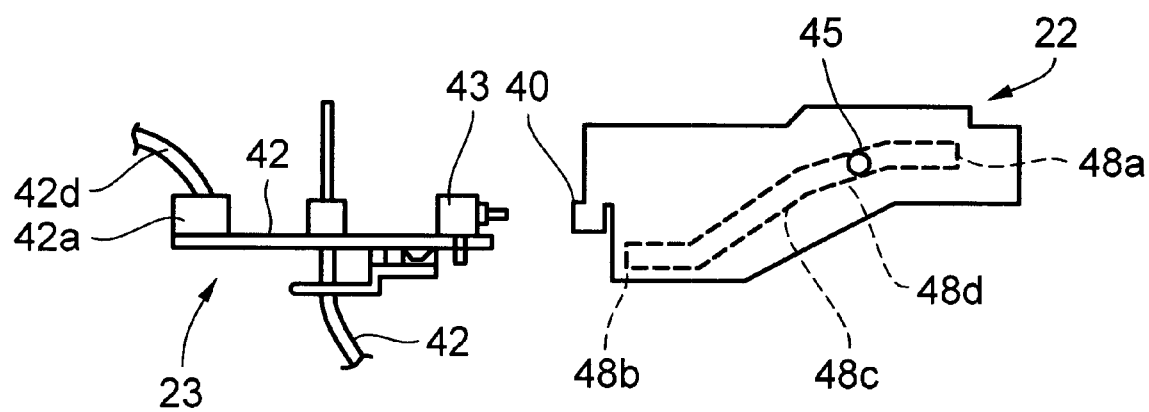
FIG. 8B is a schematic view illustrating the relative position between the bracket and the circuit in FIG. 8A.

As shown in FIG. 8B, since the bracket 22 moves along the arrow direction B as long as the pinion 36b is engaged with the lateral rack 26b and continued to rotate, the protrusion 45 inserted in the guide cam groove 48 of the bracket 22 passes through the first slant portion 48c with steep slope and is located in the second slant portion 48d with gentle slope so that the up-down pivoting base 24 begins to pivot upwards on the shafts 44.

On the other hand, when the protrusion 45 passes through the first slant portion 48c, the speed of said up-down pivoting base 24 increases because the disk does not come into contact with the turntable. But when said protrusion 45 passes through the second slant portion 48d, the disk comes into contact with the turntable. Thus, in order to place the disk on the turntable safely, the speed of said pivoting base 24 must be reduced. Thereafter, when the locking device 41 projected from the upper end of said bracket 22 comes into contact with the stopper 29 formed on the underside of the tray 21, the shifting of said tray 21 in the inverse direction of the arrow direction A is prevented. That is, the stopper 29 prevents the ejection of the tray 21 due to a careless mistake of the user or an external impact when the loading operation of the tray 21 is finished.

Thereafter, by the continuous rotation of the loading motor 21, the bracket 22 is continued to move in the arrow direction B as long as the pinion 36b moves on the slant rack 26c. When the pinion 36b begins to engage with the slanted rack 26c, the arm 37 including the idler gear 36 thereon is rotated clockwise on the first shaft 32. At this time, the guide protrusion 47 projected from said arm 37 is guided by the guide slit 39 formed on the bracket 22, and the upper end 38a of the second shaft 38 is guided by the first guide groove 27.

Figure 9A:
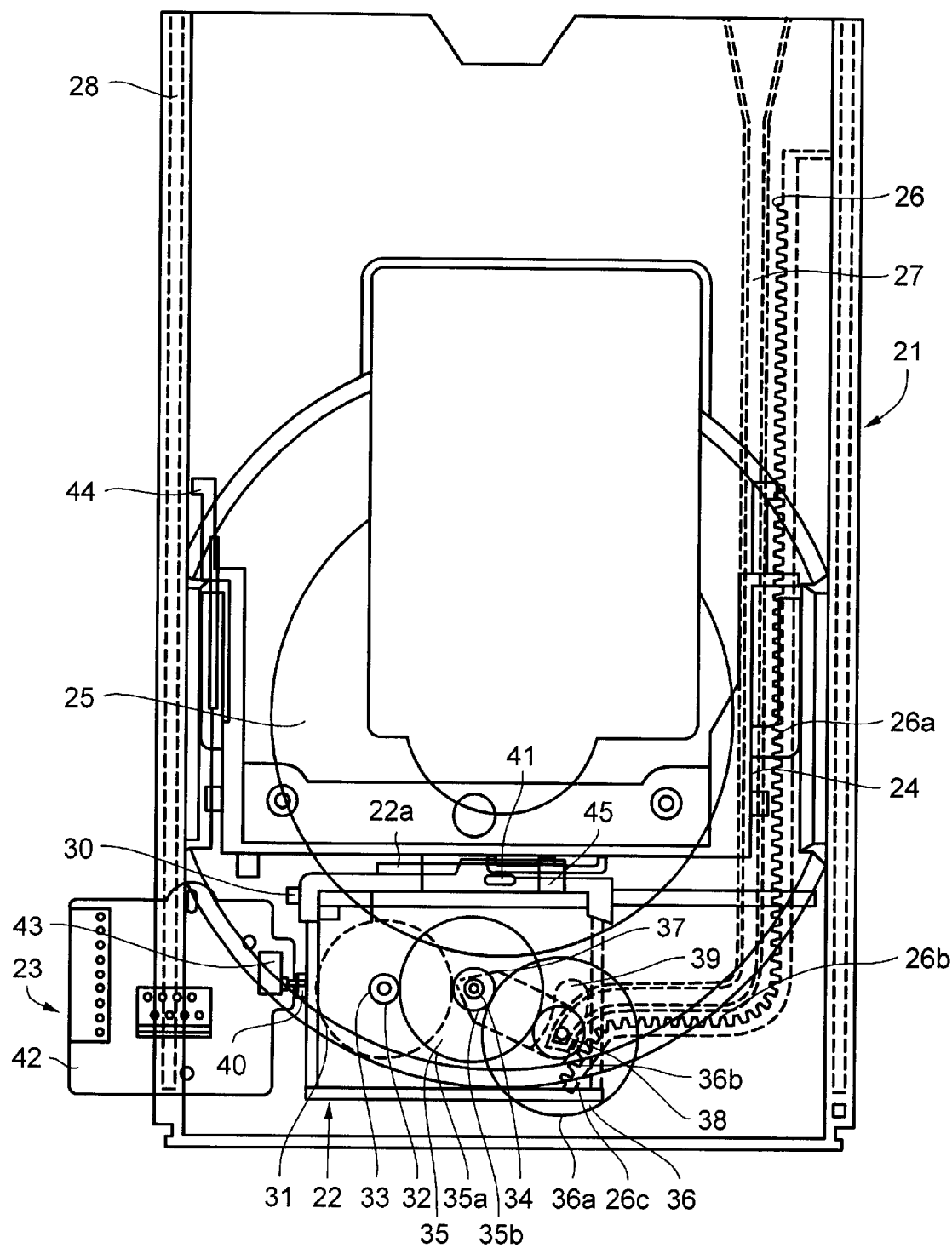
FIG. 9A is a schematic top view showing the complete state of the loading operation.
Figure 9B:
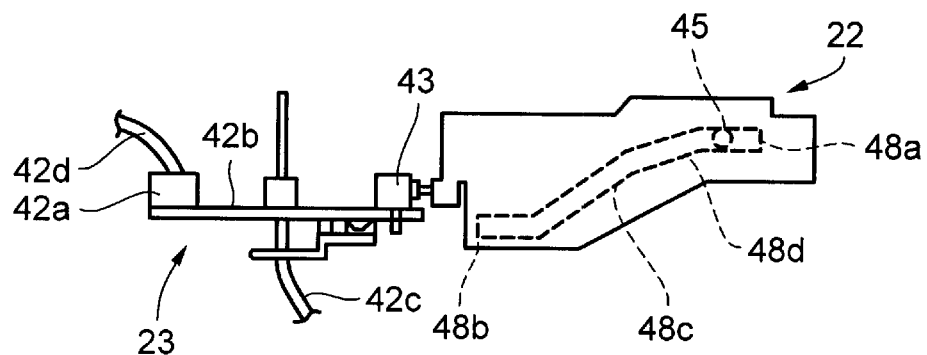
FIG. 9B is a schematic view illustrating the relative position between the bracket and the circuit portion in FIG. 9A.
Figure 9C:
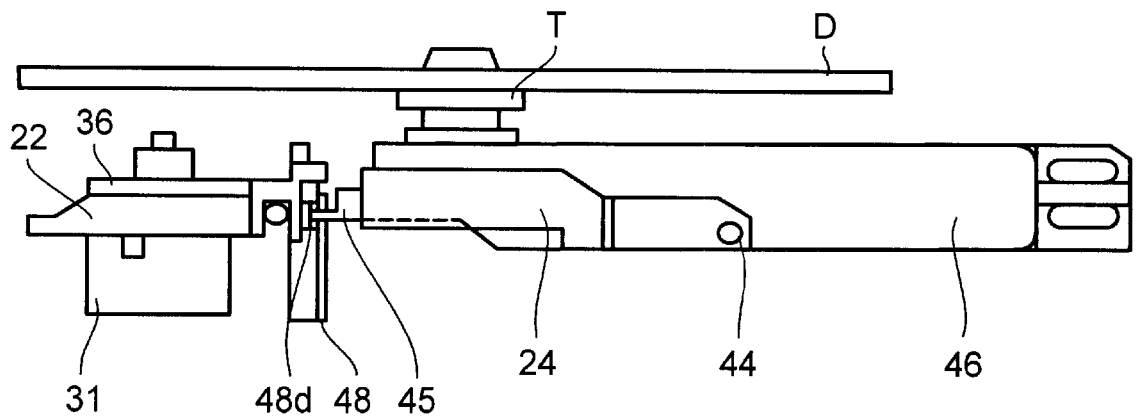
FIG. 9C is a side view of the bracket and the pickup base in FIG. 9A.
Figure 10A:
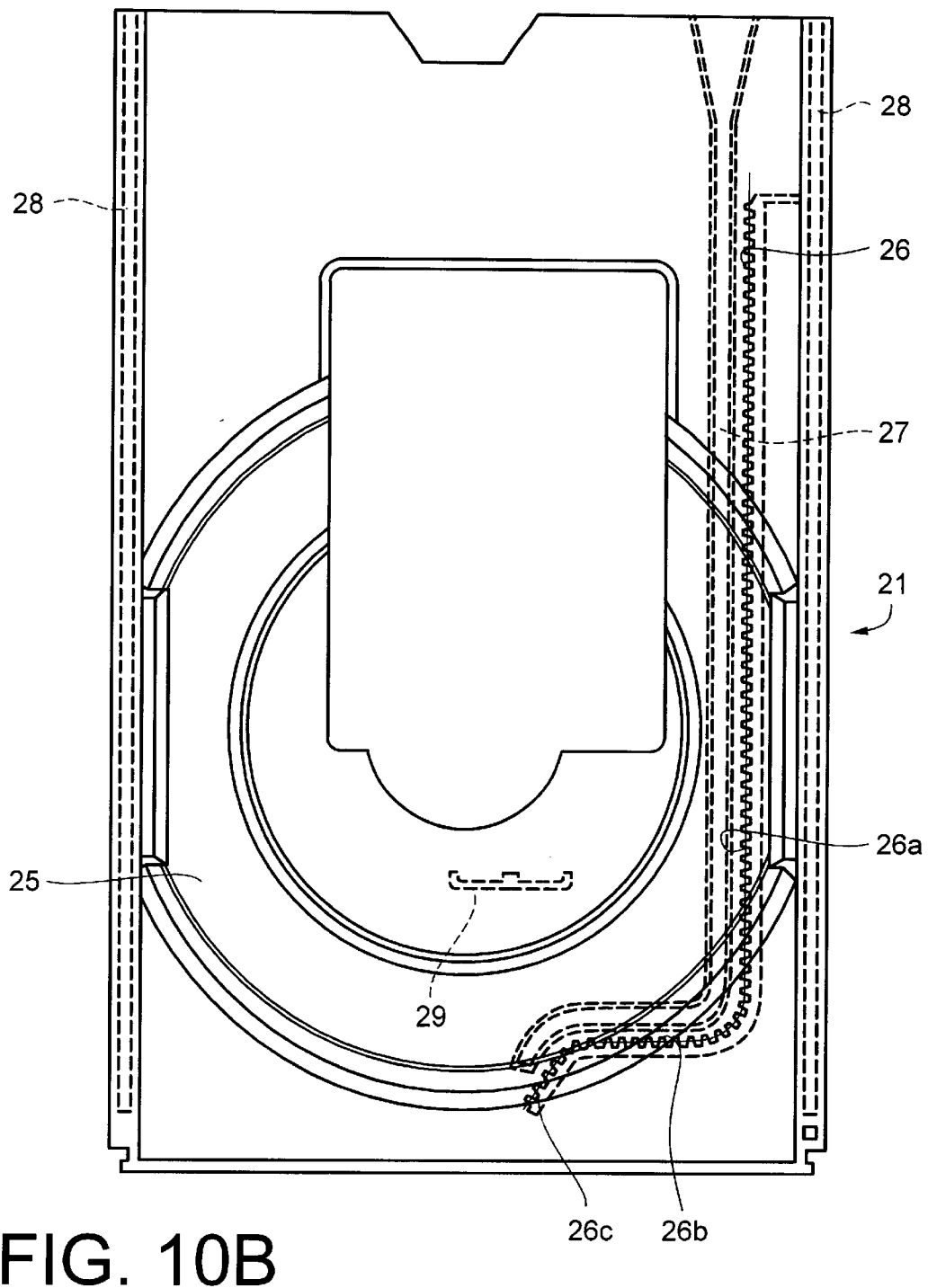
FIGS. 10A and 10B are a schematic top view and a front view of the disk tray, respectively.
Figure 10B:
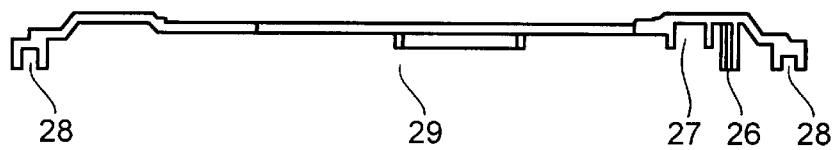

When the pinion 36b reaches the end of the slant rack 26c, the loading operation will be finished. FIG. 9A is a schematic top view showing the complete state of the loading operation, FIG. 9B is a schematic view illustrating the relative position between the bracket and the circuit portion after finishing the loading operation, and FIG. 9C is a side view of the bracket and the pickup base. As shown in FIG. 9B, when the protrusion 40 of the bracket 22 comes into contact with the switch 43 mounted on the circuit portion 23, rotation of the loading motor 31 is stopped by the operation of said switch 43. As described above, when the pinion 36b reaches the end of the slant rack 26c, said slant rack 26c prevents the movement of the driving portion DP in the arrow direction B or the inverse direction of the arrow direction B.

At this time, since the protrusion 45 of the up-down pivoting base 24 is located in the upper horizontal portion 48a of the guide cam groove 48, said pivoting base 24 and the pickup base 46 are finished moving upward. Thus, the turntable is inserted to the center hole of the disk so that the disk is loaded on the turntable.

The unloading operation of the disk tray shifting device in accordance with the present invention is performed according to the reverse order of said loading operation.

According to the present invention as described above, it is possible to minimize the installation space of components by mounting the loading motor movable along the cross direction of the main base and to transmit the driving force of the loading motor to the disk tray effectively by minimizing power transmission stages.

And it is possible to construct the disk tray shifting device simply and compactly by installing the loading motor and the power transmission means in a single bracket.

What is claimed is:

1. A loading device for a disc player, comprising:
   a main base;
   a tray that moves between a loaded position and an ejected position; and
   a loading motor movably installed on said main base, the loading motor being moved with respect to the disc player between different predetermined positions and being independently moved at least in a transverse direction with respect to the inserting direction of said tray when the tray is in the loaded position.

2. A loading device of a disc player according to claim 1, further comprising:
   a guide portion mounted on said main base for guiding said motor.

3. A loading device of a disc player according to claim 1, further comprising:
   a bracket; and
   power transmission gears installed in said bracket to transmit driving force of said driving source to said disk tray.

4. A loading device of a disc player according to claim 3, wherein said power transmission gears comprises:
   a gear mounted on a shaft of said motor;
   an intermediate gear mounted on a shaft of said bracket for receiving rotating force of said gear; and
   an idler gear mounted rotatably on one end portion of an arm, wherein said arm is mounted pivotably on the shaft of said bracket.

5. A loading device of a disc player according to claim 4, wherein a guide slit is formed on one end portion of said bracket, and a guide protrusion is projected downwards from one end portion of said arm to be guided by said guide slit.

6. A loading device of a disc player according to claim 3, further comprising:
   an up-down pivoting base with a protrusion projecting from a front-end,
   wherein said bracket further comprises a guide cam groove engraved on a rear surface thereof, and said guide cam groove is engaged with the protrusion projected from the front end of the up-down pivoting base.

7. A loading device of a disc player according to claim 6, wherein said guide cam groove comprises:
   a lower horizontal portion;
   a first slant portion with a first slope;
   a second slant portion with a second slope that is less than said first slope; and
   an upper horizontal portion.

8. A loading device of a disc player according to claim 1, wherein said motor is moved in a direction transverse to a shifting direction of the disk tray.

9. A loading device of a disc player according to claim 8, wherein said motor does not move during the shifting operation of said disk tray, and said motor begins to move transverse to the moving direction of said disk tray when the shifting operation of said disk tray is finished.

10. A loading device of a disc player according to claim 9, wherein a rack portion is formed on the underside of said disk tray, and said rack portion includes a longitudinal rack formed along the shifting direction of said disk tray and a lateral rack formed along a direction transverse to the shifting direction of said disk tray.

11. A loading device of a disc player according to claim 8, wherein both directions are perpendicular to each other.

12. A loading device of a disc player according to claim 1, further comprising a circuit portion including a position sensing means for detecting the position of said motor.

13. A loading device of a disc player according to claim 12, wherein said position sensing means is located on the moving path of said motor.

14. A loading device of a disc player according to claim 1, further comprises a switch operating portion for operating said position sensing means.

15. A loading device of a disc player according to claim 1, further comprising:
  a main circuit portion for supplying electrical signals to said motor,
  a spindle motor driving a turntable, and
  a main controller of the player.

16. A loading device of a disc player according to claim 1, further comprising:
  a stopper formed on one side of the disk tray; and
  locking portion formed on said motor and coming into contact with said stopper after the shifting operation of said disk tray is finished.

17. A loading device of a disc player according to claim 16, wherein said locking portion is a protrusion projected from the upper side of said bracket, and said stopper is formed on the underside of said disk tray.

18. A loading device of a disc player according to claim 16, wherein said locking portion comes into contact with said stopper when said motor is moved transverse to the moving direction of said disk tray.

19. A loading device of a disc player according to claim 1, wherein a circuit portion is mounted on said main base for lifting an up-down pivoting base.

20. A loading device of a disc for an optical disk player, comprising:
  a main base;
  a tray that moves between a loaded position and an ejected position; and
  a driving unit having a motor and a gear assembly, the motor being moved with respect to the disc player between different predetermined positions and being independently moved at least in a transverse direction with respect to the inserting direction of said tray when the tray is in the loaded position.

21. A loading device of a disc player according to claim 20, further comprising:
  a guide portion mounted on said main base for guiding said driving unit.

22. A loading device of a disc player according to claim 20, wherein said driving unit comprises:
  a bracket;
  a driving source installed in said bracket; and
  power transmission means installed in said bracket for transmitting driving force of said driving source to said disk tray.

23. A loading device of a disc player according to claim 22, wherein a guide slit is formed on one end portion of said bracket, and a guide protrusion is projected downwards from one end portion of said arm to be guided by said guide slit.

24. A loading device of a disc player according to claim 22, further comprising:
  an up-down pivoting base with a protrusion projecting from a front-end,
  wherein said bracket further comprises a guide cam groove engraved on rear surface thereof, and said guide cam groove is engaged with the protrusion projected from the front end of the up-down pivoting base.

25. A loading device of a disc player according to claim 24, wherein said guide cam groove comprises:
  a lower horizontal portion;
  a first slant portion with a first slope;
  a second slant portion with a second slope that is less than said first slope; and
  an upper horizontal portion.

26. A loading device of a disc player according to claim 20, wherein the driving unit is moved in a direction transverse to a shifting direction of the disk tray.

27. A loading device of a disc player according to claim 26, wherein both directions are perpendicular to each other.

28. A loading device of a disc player according to claim 20, further comprising:
  a circuit portion including a position sensing means for detecting the position of said driving portion.

29. A loading device of a disc player according to claim 28, wherein said driving unit includes a switch operating portion for operating said position sensing means.

30. A loading device of a disc player according to claim 28, wherein said position sensing means is located on the moving path of said driving portion.

31. A loading device of a disc player according to claim 20, further comprising:
  a stopper formed on one side of the disk tray; and
  locking means formed on said driving unit and coming into contact with said stopper after shifting operation of said disk tray is finished.

32. A loading device of a disc player according to claim 31, wherein said locking means is a protrusion projected from upper side of said bracket, and said stopper is formed on the underside of said disk tray.

33. A loading device of a disc player according to claim 32, wherein said locking means come into contact with said stopper when said driving portion is moved transverse to the moving direction of said disk tray.

34. A loading device of a disc for an optical disk player, comprising:
  a tray for movement between a loaded position and an ejected position; and
  a driving unit that moves relative to the disc player between different predetermined positions, and being independently moved at least in a transverse direction with respect to the inserting direction of said tray when the tray is in the loaded position, wherein said driving unit comprises:
  a motor;
  a tray driving part for moving the tray between the loaded position and the ejected position based on a driving power of said motor; and
  a pick-up driving part for moving a pick up vertically.

35. A loading device of a disc player according to claim 34, wherein said tray driving part is a gear assembly connecting said motor with said tray.

36. A loading device of a disc player according to claim 34, wherein said pick-up driving part is a cam groove formed on a peripheral portion of said driving unit.

37. A method of moving a tray and moving upward and downward a pick up, comprising:
  moving a tray between a loaded position and an ejected position by transmitting a driving power of a motor into said tray;
  beginning to move said motor to a first predetermined position, the movement being independent at least in a transverse direction with respect to the inserting direction of said tray when the tray is in the loaded position; and loading a pick up by using the movement of said motor so that said pick up is in a state of reading information.

38. The method according to claim 37, further comprising:

determining whether said motor reaches a second predetermined position or not; and stopping the movement of said motor when said motor is determined to have reached said second predetermined position.

* * * * *